UNITED STATES PATENT OFFICE.

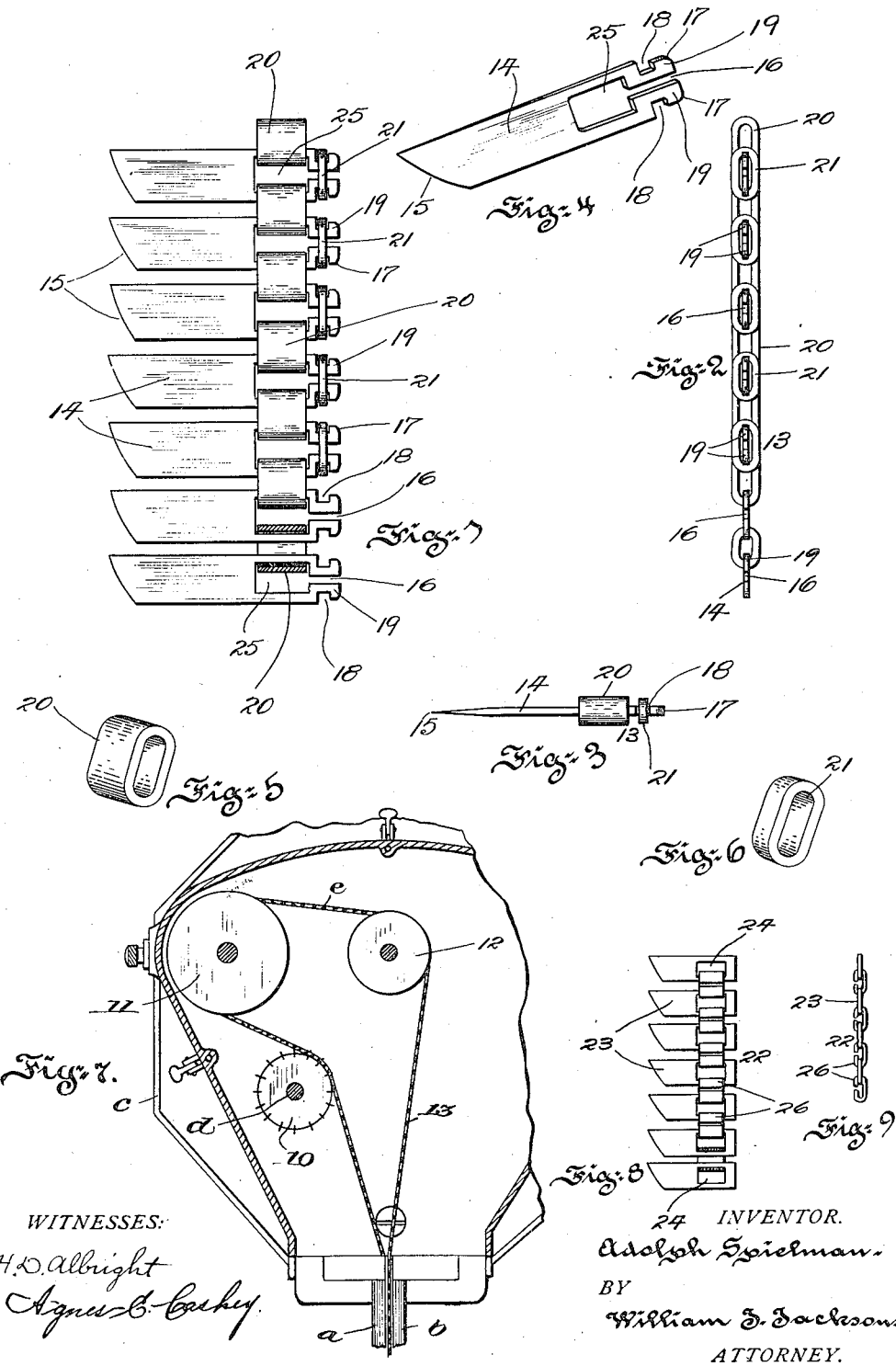

ADOLPH SPIELMAN, OF PHILADELPHIA, PENNSYLVANIA.

CUTTING-TOOL.

1,064,865. Specification of Letters Patent. Patented June 17, 1913.

Application filed January 24, 1911. Serial No. 604,301.

*To all whom it may concern:*

Be it known that I, ADOLPH SPIELMAN, a citizen of the United States, residing at Philadelphia, in the county of Philadelphia and State of Pennsylvania, have invented a certain new and useful Improvement in Cutting-Tools, of which the following is a specification.

This invention relates to tools for cutting metal, wood, cloth, leather, paper and other materials and has more particular relation to that class of cutting device, which may be termed endless cutting bands.

The principal object of the present invention may be said to be the providing of an endless band of cutting devices of an improved and novel character having interchangeable and link relation with one another, whereby substitution of cutting devices may be effected when desired without impairing the usefulness of the cutting band as a whole.

Another object of the present invention is to provide detachable locking means for securing the interchangeable parts to place.

Still other objects of the present invention relate to the providing of certain novel features of construction and combinations of parts, whereby the endless cutting band is rendered simple and inexpensive in nature, compact in form and durable in construction.

Other objects of the invention will appear hereinafter.

The invention consists in the novel construction and arrangement of parts, whereby the above results as well as others are obtained as will hereinafter be fully described, references being had to the accompanying drawings in which:

Figure 1, is a fragmentary view of the improved cutting tool the same being illustrated in side elevation, Fig. 2, is a rear view of Fig. 1, Fig. 3, is a top or plan view of Fig. 1, Fig. 4, is a perspective view of one of the interchangeable cutting devices, Fig. 5, is a similar view of one of the links used for connecting together the interchangeable cutting devices, Fig. 6, is a similar view of one of the locking links hereinafter referred to, Fig. 7, is a fragmentary view partly in front elevation and partly in section of a cloth cutting machine, equipped with the endless cutting band of the invention. Figs. 8, and 9, are fragmentary views in side and rear elevation, respectively of a somewhat modified form of cutting tool.

In the drawings, the cutting tool of the invention is made up of a multiplicity of knives interlocked one with another to form an endless band of linked elements having a relatively continuous cutting edge said endless band being calculated to have the knives of the respective bights of said band travel upon their flat sides and the knives of the opposite sides or runs of said endless band travel endwise in reverse directions. Such a cutting tool may be used for a variety of purposes, for instance, in the cutting of metal, wood, cloth, leather, paper and other materials and as occasion may demand the operating mechanism will vary. For the sake of illustration, a cloth cutting mechanism is shown in Fig. 7, of the drawings, as being one use to which the endless cutting band may be applied. This cloth cutting mechanism forms no part of the present invention, the same being fully set forth in my application for Letters Patent, filed December 29, 1910, and designated by Serial No. 599,936. In said figure, the vertical standard of the cutting machine comprises sections $a$, and $b$, grooved for the travel therethrough of the runs of the endless cutting band 13. The vertical standard in turn supports a motor $c$. The shaft $d$, of the motor has fixed thereto a main driving wheel 10, provided peripherally with teeth for meshing with and exerting an upward pull upon the endless cutting band. Idler wheels 11, and 12, are also present upon the motor casing for accepting the upper bight $e$, of the endless cutting band 13, it being understood in this connection that the knives of the runs of the endless band within the standard travel endwise and the knives of the upper and lower bights travel upon their flat sides. In practice, best results have been obtained by constructing the endless band 13, of knives 14, the cutting edges of which are slightly inclined as at 15, in order that when descending a sharp clean cut may be effected. The rear ends of the knives 14, are provided with rectangular apertures 25, terminating in slotted portions 16, that extend to and through the extreme rear portions of said knives. The rear ends of the knives 14, are slightly rounded as at 17, for a purpose to be presently described and are further equipped with recessed portions 18. The recessed portions 18, and slotted portions 16, of the knives 14, form knobs or protuberances 19. The knives 14, have interchangeable and linked relation with one another by means of unsplit relatively broad tubular links 20 having substantially flat bearing faces, see Fig. 5. The unsplit tubular links 20, connect adjacent knives 14, and in this connection, it may be said that the apertured portions 25, of said knives form convenient means for accommodating the links.

In practice, to assemble the knives the links 20, are fitted to position between adjacent knives by being passed over adjacent knobs or protuberances 19, and through the slotted portions 16, of the adjacent knives until the links 20, are accommodated by the apertured portions 25, of said knives. To retain the links against displacement, use is made of unsplit tubular sections or pieces 21. These sections or pieces 21, may be snapped over the knobs or protuberances 19, of each knife 14, and are received and interlocked by virtue of the recessed portions 18, of the knife ends. In this connection, it may be remarked that in snapping the pieces or sections 21, to place, the slotted end of each knife is squeezed together sufficiently to permit the piece or section 21, to pass over the knife end. When the piece or section 21, reaches the recessed portions 18, the slotted end of the knife may be released and being possessed of spring-like qualities returns to normal position, thereby effectively interlocking with the knife end said piece or section 21. In passing the piece or section 21, over the knife end, the rounded portions 17, of the knobs or protuberances 19, serve to facilitate the application of the piece or section 21. By this arrangement and construction of parts, it will be readily apparent in the case of breakage of one or more of the cutting tools, comprising the knife like elements that the same may be readily and conveniently removed and replaced by others without in any way, shape or form affecting the usefulness of the remaining knife like elements. Further such replacement of knife like elements may be effected in a few moments' time.

Referring now to Figs. 8, and 9, the endless cutting band 22, is shown as being made up of knife like cutting elements 23, apertured as at 24. Adjacent knives are coupled or linked together by means of split link like pieces 26, said links being accommodated by the apertured portions 24, of the knife like members 23.

What I claim is.

1. A cutting tool comprising a multiplicity of interchangeable knives forming an endless band the knives of the respective bights of which are adapted to travel upon their flat sides and the knives of the runs of which travel endwise, each knife consisting of a thin flat member having at one of its ends a single cutting edge and having its opposite end apertured and tubular links between adjacent knives said links being accommodated by the apertured portions of said knives.

2. A cutting tool comprising a multiplicity of interchangeable knives forming an endless band, the knives of the respective bights of which are adapted to travel upon their flat sides and the knives of the runs of which travel endwise, each knife consisting of a narrow elongated thin flat member having at one of its ends a single cutting edge and having at its opposite end a rectangular aperture and tubular links between adjacent knives said links being accommodated by the apertured portions of said knives.

3. A cutting tool comprising a multiplicity of knife-like elements interchangeably linked one with another to form an endless band, the knives of the respective bights of which are adapted to travel upon their flat sides and the knives of the runs of which travel endwise, said elements having apertured and slotted ends and tubular links removably accommodated by the apertured portions of each element.

4. A cutting tool comprising a multiplicity of knife like elements interchangeably linked one with another said elements having recessed and slotted ends and unsplit tubular links removably accommodated by the recessed portions of each element.

5. A cutting tool comprising a multiplicity of knife like elements each element having an inclined cutting edge and an apertured rear portion terminating in a split end said end having recessed portions, unsplit tubular links accommodated by the apertured portions and connecting adjacent elements and unsplit tubular pieces fitted over the split ends of each element and accommodated by the recessed portions thereof.

6. A cutting tool comprising knife like elements interchangeably linked together, said elements having split ends, and detachable retaining devices for interlocking with the split ends of each element.

7. A cutting tool comprising knife like elements having a relatively large centrally disposed rectangular aperture adjacent its rear end said aperture terminating in a contracted slotted portion extending horizontally to and through said rear end of the element, the rear end of said element being vertically recessed intermediate the apertured and rear portions thereof.

8. A cutting tool comprising a multiplicity of interchangeable flat one-piece knives forming an endless band, the knives of the respective bights of which are adapted to travel upon their flat sides and the knives of the runs of which travel endwise, each knife having an apertured end and tubular links between adjacent knives said links being accommodated by the apertured portions of said knives.

9. A cutting tool comprising a multiplicity of flat one-piece knives arranged to form a knife-chain, the knives of the respective bights of which are adapted to travel upon their flat sides and the knives of the runs of which travel endwise, each knife having the end opposite its cutting edge apertured and tubular links for interchangeably connecting the apertured ends of said knives together said apertures serving to provide drive wheel teeth receiving means.

10. A cutting tool comprising a multiplicity of interchangeable flat one piece knives arranged to form a broad substantially flat belt-like knife-chain, each knife having at one of its ends a single cutting edge and having its opposite end provided with a rectangular opening for link and drive wheel teeth reception and relatively broad tubular links between adjacent knives said links being accommodated by the apertured portions of said knives said links being provided with relatively flat bearing faces.

In testimony whereof, I have hereunto signed my name.

ADOLPH SPIELMAN.

Witnesses:
HAINES D. ALBRIGHT,
AGNES E. CASKEY.